United States Patent [19]

Schwartz et al.

[11] Patent Number: 4,767,205

[45] Date of Patent: Aug. 30, 1988

[54] COMPOSITION AND METHOD FOR HIDDEN IDENTIFICATION

[75] Inventors: Abraham Schwartz, Durham, N.C.; Gary A. Woodward, Alexandria, Va.

[73] Assignee: Flow Cytometry Standards Corporation, Research Triangle Park, N.C.

[21] Appl. No.: 823,208

[22] Filed: Jan. 28, 1986

[51] Int. Cl.[4] .................................. G06K 9/74
[52] U.S. Cl. .................................... 356/71
[58] Field of Search ................ 356/71; 250/458.1

[56] References Cited

U.S. PATENT DOCUMENTS

| | | | |
|---|---|---|---|
| 447,336 | 3/1891 | MacDonough | 162/140 |
| 3,473,027 | 10/1969 | Freeman et al. | 250/71 |
| 3,491,237 | 1/1970 | Tillett | 250/458.1 |
| 3,500,047 | 3/1970 | Berry | 250/71 |
| 3,621,250 | 11/1971 | Wetzstein | 250/71 |
| 4,247,434 | 1/1981 | Vanderhoff et al. | 260/29.6 RB |
| 4,336,173 | 6/1982 | Ugelstad | 260/29.6 RW |
| 4,451,521 | 5/1984 | Kaule et al. | 356/71 |
| 4,451,530 | 5/1984 | Kaule et al. | 356/71 |
| 4,476,382 | 10/1984 | White | 235/491 |
| 4,514,085 | 4/1985 | Kaye | 356/71 |
| 4,533,489 | 8/1985 | Utts et al. | 250/458.1 |

OTHER PUBLICATIONS

Shedding Light on Marking Techniques, May, 1983, Security Management NASA TM78132 entitled "Large-Size Monidisperse Latexes As A Commercial Space Product".

Advances in Identification, Jul. 1984, Security Management 6 Sheets Ion-Guard trade literature (Undated).

Primary Examiner—R. A. Rosenberger
Assistant Examiner—Crystal Cooper
Attorney, Agent, or Firm—Steven J. Hultquist

[57] ABSTRACT

An identification method and identification kit are based upon making up groups of microsized particles normally invisible to the naked eye with each particle in each group being of a selected uniform size, shape and color. Coded identification is established by transferring a population of particles from a selected number of the groups to the item to be identified and then confirming such identification by examining the marked item under high magnification with a light microscope.

39 Claims, 2 Drawing Sheets

COMPOSITION AND METHOD FOR HIDDEN IDENTIFICATION

DESCRIPTION

1. Technical Field

The invention relates to a composition and method for identifying items such as papers, appliances and office equipment in a clandestine manner. More specifically, the invention is based upon the use of microparticles, normally invisible to the naked eye, of controlled shape, size and color to establish an identifying code detectable with a light microscope.

2. Background Art

Various means have been devised for marking and identifying items in clandestine ways. Common marking schemes use photoluminescent and/or ultraviolet inks or paint which can be observed only under the proper illumination, e.g., under ultraviolet light. More sophisticated methods and systems involve coding with specific symbols formed from photoluminescent and/or ultraviolet compounds. Representative of such systems and methods are those described in U.S. Pat. Nos. 3,473,027 to Freeman et al, and 3,500,047 to Berry. In addition to ultraviolet dye coding, a system currently marketed under the name Ion-Guard uses ultraviolet dyes with various concentrations of rare earth elements which can be converted into a ten digit code and interpreted by energy dispersive x-ray fluorescence. When subjected to x-rays, each element gives off x-ray fluorescence characteristic of that element. Other encoding systems described in U.S. Pat. Nos. 3,621,250 to Wetzstein and 4,476,382 to White involve geometric positioning of dots containing specific elements that can be detected by x-ray fluorescence. This fluorescence, together with the geometric positions of the dots, comprise the encoding of the system. Another process using ultraviolet radiation is described in U.S. Pat. No. 3,666,946 to Trimble. Mention is made in the Trimble patent that the encoded datum established by binarily-weighted ink components can be shaped so as to be human readable.

A publication on marking techniques useful as background is the article "Shedding Light On Marking Techniques", May, 1983, Security Management.

One of the goals of encoding is to be able to efficiently label large numbers of items such as documents, office equipment, appliances, and the like. Such encoding should allow for tracing and positive identification of each individual item. Detecting items marked with a substance that can only be detected by specialized means, e.g. fluorescent dyes in conjunction with ultraviolet light, is dramatic because a seemingly invisible mark in normal light suddenly becomes brightly fluorescent under the proper illumination. However, since some fluorescent dyes are highly colored and can be detected with the naked eye even in small quantities, it can be seen that the fluorescent dye-UV light approach has a marked disadvantage. Further, this approach has another disadvantage in that the dyes can be washed off. It is also noted that using one or several dyes cannot provide unique identification to a large number of individual items.

It has been proposed, as for example, in the Ion-Guard system to mark with mixed elements in specific quantities and analyze the elements with an x-ray energy dispersive spectrometer. Such an analysis, however, requires both expensive equipment and highly trained technicians. Furthermore, such an analysis has an inherent source of possible error in the quantitative analysis due to possible inhomogeneities in the mark itself. This factor leaves a significant degree of doubt in the identification. Arguments may also be made that the elements incorporated in the mark, such as rare earth elements, do naturally occur in nature and their presence may not be a part of the mark.

While other prior art practices and references might be referred to, the above is believed sufficient as background for the present invention. The foregoing, is also believed sufficient to indicate that there is a need for an improved system which will positively and uniquely mark a large number of individual items in a clandestine manner. Also, in such improved system the possibility of the mark or portions thereof being naturally or normally occurring would desirably be eliminated or in the least greatly minimized as compared to present practices. In addition, the mark of such improved system would ideally be durable enough to withstand whatever environment it may be subjected to between the time of application and its subsequent identification. Meeting these needs becomes the object of the invention which along with other objects will become apparent as the description procedes.

DISCLOSURE OF INVENTION

The marking system according to the present invention addresses those considerations and requirements set forth above. In meeting the stated objective, mention is first made that the present invention is based upon establishing a code identification by use of particles of precise size, shape and color and applying such particles and combinations of such particles of different precise size, shape and color to the item to be marked such as a document, piece of office equipment, an appliance, or the like. The preferred particle used as a coding device is a microbead of precise and highly uniform size, shape and color. Observing a small "population", e.g., 6 particles, provides positive coded identification of the particular microbead. Populations of microbeads of precise size, shape, and color establish the coded identification. Methods of making microbeads with sufficient uniformity of size and shape suited for the invention are described in U.S. Pat. Nos. 4,247,434 and 4,336,173 and also in the publication NASA TM78132 entitled "Large-Size Monodisperse Latexes As A Commercial Space Product". While the general technology of making microbeads has become well established, so far as is known, no prior art system, coded ink or the like has utilized or recognized the possibe use of microbeads for microbead coding in the manner of the present invention.

The code identifying system of the invention is based on combining highly uniform microbeads which have specific sizes, from 2–20 microns (below the resolution of the naked eye) and specific physical properties, e.g. spectral, radioactive, magnetic, et cetera. The microbeads are synthetic, highly stable and unique and so far as applicant is aware are unlike any substance occurring in nature and thus confusion with natural substances is avoided. The coded microbeads are easily observed, recognized and identified with a standard light microscope. The microbeads of the invention may contain special dyes, e.g. UV or infrared excited, as well as normal visible dyes such that their properties in terms of uniqueness will be further enhanced. The invention microbeads may also contain magnetic material so that they may be separated when incorporated into mixtures of other materials.

DESCRIPTION OF DRAWINGS

FIG. 10 is a microscopic view of a removed portion of the spot of the cured microbead mixture of FIG. 9.

BEST MODE FOR CARRYING OUT THE INVENTION

The invention as previously stated is based on making up groups of normally invisible micro-sized particles with each particle in each group being of a selected uniform size, shape and color. Coded identification is then established by affixing particles from at least one group but preferably from several groups to the item to be identified. Confirmation of the identification is made by observing the marked item under high magnification (e.g., 100-1000x) with a light microscope. While it is recognized that the particles could take many forms and shapes and be made of any of various materials, the preferred particle is a microbead of spherical shape formed of polymeric material and colored by copolymerization of the dyes into the microbeads or diffusing the dyes into microbeads swollen by solvents. Any of the previously-identified methods of making microbeads of uniform size may be employed and any of other methods of dyeing or otherwise coloring the microbeads to obtain a particular selected color may also be employed.

With the foregoing in mind, a first step whether dealing with identifying a soft item such as a document or cloth or with identifying a hard item such as a piece of equipment or appliance is to make up the groups of microbeads with the microbeads in each group being of uniform size and color.

Figure 1:
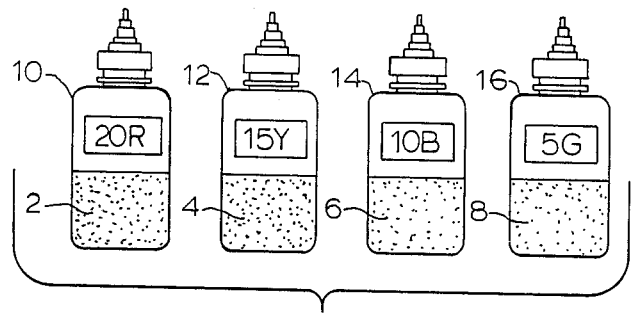
FIG. 1 shows four containers, each containing a group of particles of uniform size, shape and color, but different from group to group in the respective containers.

Thus, in the methods described hereinafter with reference to FIG. 1, there is indicated, merely by way of example, the making up of four different sized microbeads in four different colors, e.g. 20 micron Red microbeads 2 in container 10, 15 micron Yellow microbeads 4 in container 12, 10 micron Blue microbeads 6 in container 14, and 5 micron Green microbeads 8 in container 16.

When microbeads of the type described are used in combinations with each other, not only does the uniqueness of the mark increase but the number of possible individual marks or encodings increase significantly. For example, the microbeads could be made up in four different sizes, namely 20, 15, 10, and 5 microns in diameter. These particular sizes can easily be seen and distinguished from one another at standard magnifications of 100-400× in a light microscope and still be below the resolution of the naked eye. When each of these sized microbeads is prepared in five different colors, e.g., red, green, orange, blue and yellow the result is to produce a total of twenty unique microbeads each of which is readily identified with a light microscope. If a typical mark or code always contained a combination of five of these twenty different microbeads, then the number of possible combinations for individual codes would equal to 20×19×18×17×16 or 1,860,480. The degree of decoding accuracy in such an example would be very high because decoding is qualitative rather than quantitative in nature, i.e., as long as a population of each of the five different microbeads can be observed and identified, the decoding can be complete. The ability to achieve high uniformity of the microbeads as set forth in the references previously identified makes the invention possible. The distributions of each of the microbead batches can in practice be made so tight that there is no overlap between the microbead batches of different size.

One format of the invention is to suspend combinations of the invention microbeads in aqueous surfactant solutions. These suspensions are then applied to paper or cloth items, e.g., an original document, paper currency or clothing. The surfactant allows the microbeads to wick into the fibers of the paper or cloth. Under the microscope the coded microbeads may be observed within the fibers of the paper of cloth. This procedure is illustrated in FIGS. 1-6.

The aforementioned groups of microbead particles in each of the previously described containers 2,4,6, and 8 are of uniform size, shape, and color in each container, but different from container to container.

Figure 2:
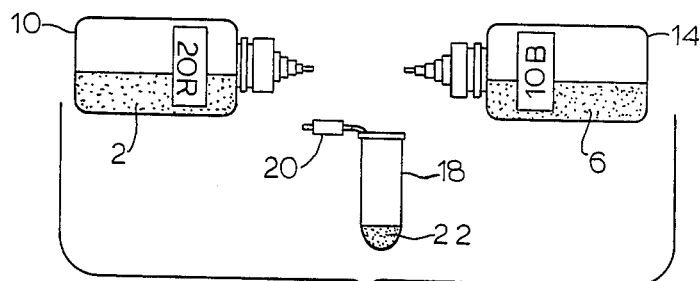
FIG. 2 shows two of the FIG. 1 containers in dispensing position, to dispense equal amounts of the respective microbead solutions into a receptacle to make up a coding microbead mixture.
Figure 3:
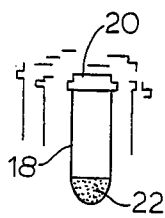
FIG. 3 shows the receptacle of FIG. 2, containing the dispensed microbeads, being shaken to produce a uniform mixture of the constituent microbeads.
Figure 4:
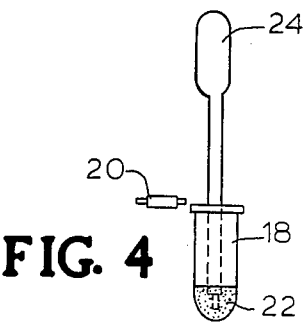
FIG. 4 shows the withdrawal of the microbead mixture from the receptacle by a dropper.
Figure 5:
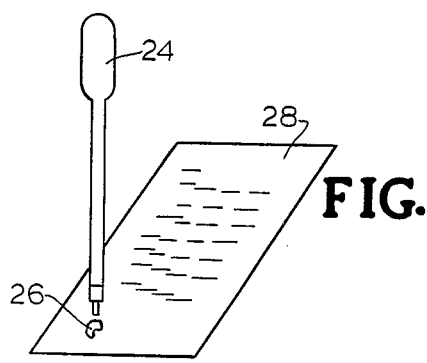
FIG. 5 shows dispensing of the microbead mixture from the dropper onto a paper substrate.
Figure 6:
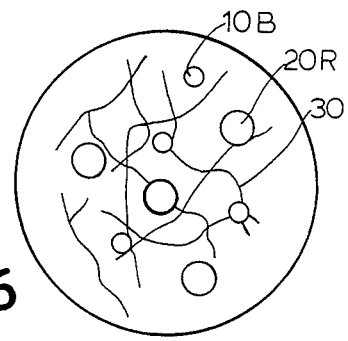
FIG. 6 is a representation of a microscopic view of the microbead mixture in the paper substrate of FIG. 5, after drying of the applied microbead mixture.

As shown in FIG. 2, the 20 micron Red microbeads 2 in container 10 and the 10 micron Blue microbeads 6 in container 14 are selected to make up the code. From containers 10 and 14, shown in dispensing position, equal amounts of microbeads 2 and 6 are despensed into receptacle 18 provided with closure 20. In such manner, there is provided a mixture 22 of microbeads 2 and 6 in the receptacle. FIG. 3 depicts the subsequent shaking of the receptacle 18 with the cap 20 in closed position, so that the microbead mixture 22 is well mixed. The receptacle is next opened, as shown in FIG. 4, and a portion of the microbead mixture 22 is withdrawn in dropper 24. FIG. 5 shows the subsequent step of dispensing a drop 26 of the mixture 22 from dropper 24 onto paper document 28. The dispensed drop is spread on the document with the tip of the dropper, and allowed to dry.

Subsequent to drying, when the coded document is examined under a microscope, the 10 micron Blue microbeads and 20 microns Red microbeads are clearly visible as dispersed into the fibrous web 30 of the paper document.

Another format of the invention is to incorporate the invention coded microbeads into a chemical vehicle, e.g., epoxy resin, which contains additional UV dyes, and apply this vehicle to a random place on equipment. An initial determination of the presence of a mark is made by exposure to a standard UV light. This step verifies that the equipment has been marked. Further examination is achieved by peeling a portion of the epoxy mark off the equipment and examining it under a microscope to allow decoding of the microbead combination and positive identification of the particular equipment. In addition, with the microbeads combined with the vehicle containing different UV dyes, the number of possible codes increases by a factor equal to the number of different UV dyes.

An illustrative embodiment of the coding/decoding procedure described in the preceding paragraph is shown in FIGS. 7-10.

Figure 7:
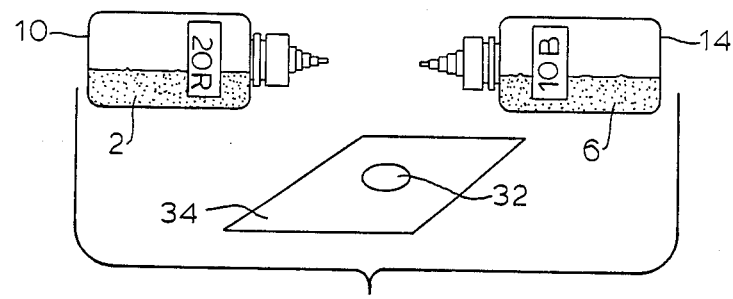
FIG. 7 shows two of the containers of FIG. 1 in dispensing position, to dispense microbeads into a resin to form a coding microbead mixture therein.

Subsequent to making up groups of particles of uniform size, shape, and color in each group but different from group to group as previously described with reference to FIG. 1, the microbeads to be employed in making the code are selected. FIG. 7 shows the use of the 20 micron Red microbeads, 2 from container 10 and 10 micron Blue microbeads 6 from container 14 as having been selected. With these containers in dispensing position, the respective microbeads 2 and 6 are dispensed in equal amount into a quanity of resin 32 on the mixing board 34.

Figure 8:
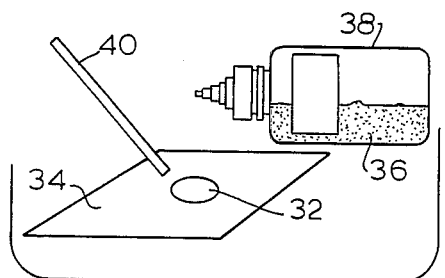
FIG. 8 shows the addition of a curing agent containing a fluorescent dye to the microbeads deposited in the resin as shown in FIG. 7.

Next, as shown in FIG. 8, a curing agent 36 for such resin 32, containing a fluorescent dye, is dispensed from container 38 onto the mixing board 34 for mixing with the resin 32, in an equal volume to the resin. Mixing of the resin and hardener is effected with mixing stick 40.

Figure 9:
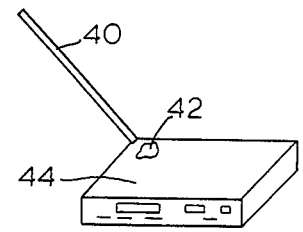
FIG. 9 shows the illumination of the equipment item from FIG. 10 with ultraviolet light to reveal the location of the applied spot of microbead mixture.
Figure 10:
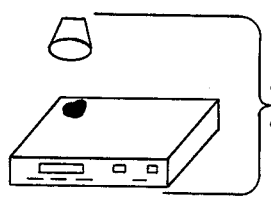
FIG. 10 shows the application of a thin spot of the mixed microbead mixture of FIG. 8 to a piece of equipment.
Figure 11:
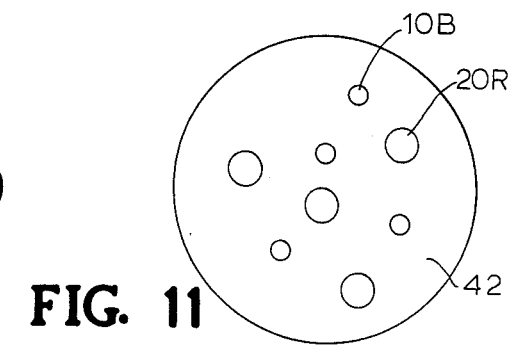
FIG. 11 shows the application of a microbead mixture prepared according to the steps shown in FIGS. 1-4, to a bed of powdered sugar, with the microbeads having a magnetic character.

FIG. 9 shows the subsequent application of the microbead mixture in the resin/hardener to equipment item 44 by means of the mixing stick 40, a thin spot 42 of the microbead mixture thereby being applied. The resin/curing agent mixture containing the microbead mixture is then allowed to set. After curing, as shown in FIG. 10, an ultraviolet light source 46 may be employed to direct UV light onto the equipment item 44 to reveal the location of the coded spot 42. A portion of the spot then may be peeled off the equipment item and examined under a microscope, yielding the microscopic view shown in FIG. 11, in which the 10 micron Blue microbeads and 20 micron Red microbeads are clearly visible.

Still another format of the invention is to combine small amounts of the uniform dyed microbeads containing magnetic material with other wet or dry materials, e.g., dynamite, animal feeds, or petroleum products. Application of a magnetic field separates the dyed magnetic microbeads from the other components and concentrates them such that decoding can be accomplished under a microscope.

Figure 12:
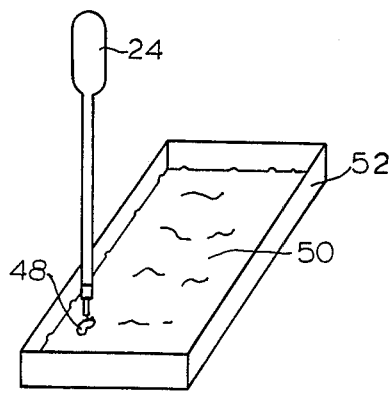
FIG. 12 shows a magnet after contacting with the microbead mixture-containing bed of powdered sugar in FIG. 11, having attached thereto magnetic particles collected from the powdered sugar bed containing the microbead mixture.
Figure 13:
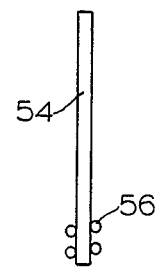
FIG. 13 shows a microscopic view of the particles collected by the magnet in FIG. 12, as removed from the magnet for observation.
Figure 14:
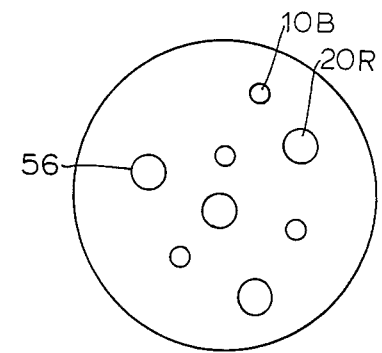

This is illustrated in FIGS. 12-14, showing the steps which may conveniently be carried out after the procedure described in connection with FIGS. 1-4 has been performed.

FIG. 12 shows the dispensing of dry microbead mixture 48 from dropper 24 after the procedure of FIGS. 1-4 has been performed. The microbead mixture 48 is mixed with a quantity of powdered sugar 50 in container 52, to thereby form a powdered sugar mixture which is coded by the microbead mixture. As indicated, the coding microbeads may contain magnetic material.

The coding powdered sugar is then decoded as shown in FIG. 13, in which magnet 54 has been placed in contact with the coded sugar mixture to collect the magnetic microbead particles 56 therefrom. The collected magnetic particles next are separated from the magnet and placed on a microscope slide for viewing, yielding the microscopic view shown in FIG. 14, in which the collected magnetic particles are revealed as comprising the 10 micron Blue microbeads and 20 micron Red microbeads.

Various examples, using the letter "u" as the symbol for microns, will next be given of how the invention has been carried out in actual practice:

EXAMPLE 1

A combination of $20\mu$ Red, $15\mu$ Blue, $15\mu$ Green, and $10\mu$ Yellow microbeads were suspended in a aqueous 0.25% sodium lauryl sulfate solution and thoroughly mixed. The shorthand designation of this coded combination would be 20R15B15G10Y. Small drops (25 $\mu$l) of the suspension were placed at specific positions on a document such as at the end of each paragraph and allowed to dry. After drying, the high dispersion of the microbeads into the fibers of the documents left no visible trace of the mark to the naked eye. Under the microscope, the microbeads were easily seen. If it is known that each combination contains a $20\mu$ microbead, then the $20\mu$ microbead can serve as an internal standard and the size of the other microbeads judged accordingly.

EXAMPLE 2

A combination of $20\mu$ Yellow, $10\mu$ Blue, $5\mu$ Red microbeads (Code: 20Y10B5R) were suspended in an epoxy resin and dansyl chloride dissolved in a few drops of methanol was mixed into the curing agent. The resin and curing agent were mixed together, spots were painted onto the bottom of a radio and allowed to set. When exposed to an ultraviolet light, the spots fluoresced bright green. The spots of resin were peeled off the radio and examined under a microscope at 400×. Members of each of the microbead population contained in the code were observed and identified within the spot.

EXAMPLE 3

A combination of $20\mu$ Blue, $15\mu$ Red, $10\mu$ Red, and $5\mu$ Yellow of dry microbeads (Code: 20B15R10R5Y) containing magnetic particles were mixed with sugar in low enough concentration such that no discoloration of the sugar was seen with the naked eye. An electromagnet was moved through the sugar and the microbeads which collected were deposited on a glass slide and examined under a microscope. Representative members of each of the coded microbeads were identified on the slide.

EXAMPLE 4

Example 2 was repeated with 20μ microbeads containing dansyl chloride dye and 15μ microbeads containing europium chelate. The coded combination was such that when viewed under a fluorescent microscope with UV excitation, the 20μ microbeads exhibited green and the 15μ microbeads exhibited red fluorescence, respectively. The code for this Example 4 would be 10fG15fR, standing for 10μ fluorescent Green and 15μ fluorescent Red.

What is claimed is:

1. A method for coded identification of a selected item comprising:
   (a) making up a selected number of groups of highly uniform microbeads of a size of 2–20 microns and normally invisible to the naked eye, each group being made up of highly uniform microbeads of substantially the same uniform size, shape and color with the specific combination of size, shape and color in one group not being repeated in any other group;
   (b) transferring highly uniform microbeads from a selected number of groups to the item to be identified such that the item to be identified is characterized by populations of highly uniform microbeads from the selected groups which are highly dispersed in the selected item or in a medium applied thereto, to encode such item according to the combination of size, shape and color of the highly dispersed microbeads transferred; and
   (c) examining the item or applied medium comprising the transferred highly dispersed microbeads under light microscope magnification to verify the code established by the highly dispersed microbeads so transferred.

2. The method of claim 1, including the step of separately dispersing the highly uniform microbeads from each group in the medium to be applied to the item to be identified.

3. The method of claim 1 wherein said highly uniform microbeads comprise spherical polymer microbeads.

4. The method of claim 1 wherein at least two said groups are made up and the highly uniform microbeads from at least two said groups are transferred to said item.

5. The method of claim 1 wherein said highly uniform microbeads contain a fluorescent dye and including the step of examining the transferred highly uniform microbeads under a microscope with a light source effective to cause said microbeads to fluoresce.

6. The method of claim 1 wherein said highly uniform microbeads are formed to contain a magnetic substance and including the step of initially separating the transferred highly dispersed microbeads from the item identified by magnetically attracting said transferred highly dispersed microbeads from said item.

7. The method of claim 1 wherein said selected number of groups comprises a single group.

8. The method of claim 2 wherein said highly uniform microbeads comprise spherical polymer microbeads and said medium comprises a solution in which said spherical microbeads are confined.

9. The method of claim 2 wherein said medium comprises a film forming a medium in which said spherical microbeads are confined and including the step of stripping said film from said item prior to identifying said transferred particles.

10. The method of claim 8 wherein said medium comprises epoxy resin.

11. The method of claim 8 wherein said medium contains a fluorescent dye.

12. The method of claim 10 wherein the epoxy contains a fluorescent dye.

13. An identification kit for coded identification of a selected item, comprising:
   (a) a selected number of containers;
   (b) a group of highly uniform microbeads of a size of 2–20 microns normally invisible to the naked eye within each container made up of highly uniform microbeads of substantially the same uniform microbeads of substantially the same uniform size, shape and color with the specific combination of size, shape and color in one group not being repeated in any other group; and
   (c) means to apply highly uniform microbeads from a selected number of containers to the item to be identified in the form of highly dispersed populations of microbeads from the selected groups, to encode such item according to the combination of size, shape and color of the highly dispersed microbeads transferred.

14. An identification kit as claimed in claim 13 wherein said highly uniform microbeads comprise spherical polymer microbeads.

15. An identification kit as claimed in claim 13 wherein said highly uniform microbeads are formed to contain a fluorescent dye.

16. An identification kit as claimed in claim 13 wherein said highly uniform microbeads are formed to contain a magnetic substance.

17. An identification kit as claimed in claim 13 wherein said selected number of containers comprises a single container.

18. An identification kit as claimed in claim 13 wherein said application means includes a medium containing a fluorescent dye and said highly uniform microbeads.

19. An identification kit as claimed in claim 14 wherein said highly uniform microbeads are formed to contain fluorescent dye.

20. An identification kit as claimed in claim 14 wherein said highly uniform microbeads are formed to contain a magnetic substance.

21. An identification kit as claimed in claim 14 wherein said application means includes a medium containing a fluorescent dye and said highly uniform microbeads.

22. An identified item containing a selected number of groups of highly uniform microbeads of a size of 2–20 microns and normally invisible to the naked eye, highly dispersed in the item or in a medium applied thereto; each group being made up of highly uniform microbeads of substantially the same uniform size, shape and color with the specific combination of size, shape and color in one group not being repeated in any other group.

23. An identified item as claimed in claim 22 wherein said selected number of groups comprises a single group.

24. An identified item as claimed in claim 22 wherein said highly uniform microbeads comprise spherical polymer microbeads.

25. A method according to claim 1, wherein at least two said groups are made up and the highly uniform microbeads from at least two said groups are mixed with each other and transferred to said item.

26. A method according to claim 1, wherein said item is a fibrous web.

27. A method according to claim 1, wherein said item is a paper document.

28. A method according to claim 27, wherein said highly uniform microbeads are interiorly contained in the paper document.

29. A method according to claim 1, wherein said item is cloth.

30. A method according to claim 1, wherein said item is a resin article.

31. A method according to claim 1, wherein said item is a particulate material.

32. An identified item according to claim 22, containing at least two said groups of highly uniform microbeads mixed with one another.

33. A fibrous web as the identified item according to claim 22.

34. A paper document as the identified item according to claim 22.

35. An identified item according to claim 22, wherein said highly uniform microbeads are interiorly contained in the paper document.

36. A cloth article as the identified item according to claim 22.

37. A resin article as the identified item according to claim 22.

38. A resin article as the indentified item according to claim 22, wherein the highly uniform microbeads are spherical polymeric microbeads.

39. A particulate material as the identified article according to claim 22.

* * * * *

UNITED STATES PATENT AND TRADEMARK OFFICE
CERTIFICATE OF CORRECTION

PATENT NO. : 4,767,205

DATED : August 30, 1988

INVENTOR(S) : Abraham Schwartz
Gary A. Woodward

It is certified that error appears in the above-identified patent and that said Letters Patent is hereby corrected as shown below:

Column 8, lines 13 and 14, delete the phrase "microbeads of substantially the same uniform".

Signed and Sealed this

Twenty-fourth Day of January, 1989

Attest:

DONALD J. QUIGG

Attesting Officer *Commissioner of Patents and Trademarks*